Figure 1:
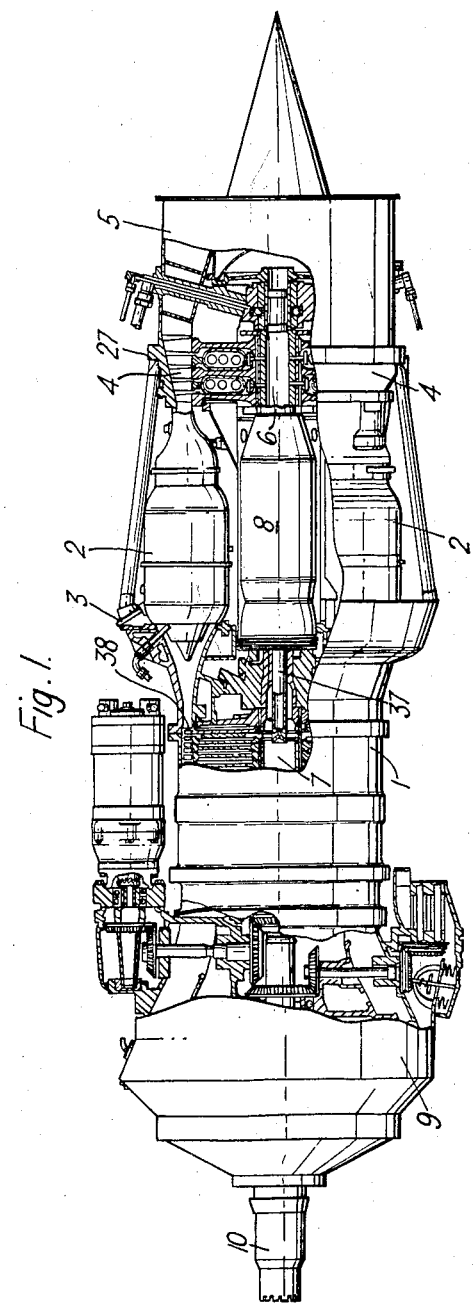

Dec. 29, 1959  J. V. BLYTH  2,919,104
INTERSTAGE SEALS AND COOLING MEANS IN AXIAL FLOW TURBINES
Filed Nov. 8, 1954  4 Sheets-Sheet 1

Inventor
Jack V. Blyth
By Watson, Cole, Grindle
Watson
Attorneys

Dec. 29, 1959      J. V. BLYTH      2,919,104
INTERSTAGE SEALS AND COOLING MEANS IN AXIAL FLOW TURBINES
Filed Nov. 8, 1954      4 Sheets-Sheet 4

Inventor
Jack V. Blyth
By Watson Cole
Grindle & Watson
Attorneys

United States Patent Office 2,919,104
Patented Dec. 29, 1959

2,919,104

INTERSTAGE SEALS AND COOLING MEANS IN AXIAL FLOW TURBINES

Jack Vallis Blyth, Ewell, England, assignor to D. Napier & Son Limited, London, England, a company of Great Britain Application November 8, 1954, Serial No. 467,612

Claims priority, application Great Britain December 2, 1953

4 Claims. (Cl. 253—39.15)

This invention relates to multi-stage axial flow machines, such as compressors or turbines.

It is an object of the invention to provide an improved interstage seal in such machines.

According to the present invention a multi-stage axial-flow machine includes at least two rotor discs each carrying a series of circumferentially spaced rotor blades constituting a rotor blade ring, and a series of circumferentially spaced stator blades constituting a stator blade ring interposed between each adjacent pair of rotor blade rings, the blades of the stator blade ring being secured at their outer ends to a stator casing surrounding the working plenum of the machine, an annular interstage body secured to and extending inwardly from the stator blade ring and lying between adjacent rotor disc, and sealing means mounted on the inner part of the interstage body and engaging with a rotary sealing member mounted on the rotor shaft, so as to provide an interstage fluid seal between the upstream and downstream sides of the stator blade ring, the diameter of the sealing member being considerably less than the diameter of the stator blade roots. The rotor shaft is preferably hollow and the machine includes means for supplying air under pressure to the annular spaces between the interstage body and the adjacent faces of the rotor discs through drillings or apertures in the hollow rotor shaft such as to provide a differential pressure acting on the rotor discs in an axial direction to oppose the dynamic thrust caused by the gas flow through the machine.

The invention is thus particularly applicable to exhaust driven turbines, in which the air supplied to the annular spaces acts also as cooling air.

Preferably the aperture or drilling, through which cooling air is fed to one side of a rotor disc, is of relatively restricted cross-sectional area as compared with the drilling or aperture through which cooling air is fed to the other side of this rotor disc, so as to create the required pressure difference across the rotor disc, and thus to provide the axial balancing thrust in a direction to oppose the dynamic thrust caused by gas flow through the machine.

According to another preferred aspect of the invention the annular interstage body is of such form and dimensions and is so arranged that its side surfaces lie closely adjacent to the adjacent surfaces of the rotor discs. The axial clearance between the side surfaces of the interstage body and the adjacent surfaces of the rotor discs, is preferably less than half and may be one eighth of the axial displacement between the adjacent rotor discs.

According to another preferred aspect of the invention the annular interstage body is in the form of a double-walled hollow annular body and is stiffened internally by a number of generally radial spacer plates extending between the annular walls of the body.

In any case the diameter of the sealing member is preferably less than half, and may be ⅓ of the diameter of the blade root platforms of the stator blade ring associated with the interstage body.

Preferably the annular body is provided on at least one of its faces which lies adjacent to a rotor disc with a series of spiral fins, such that the cooling air tends to flow in a spiral path outwards over the rotor disc.

According to another aspect of the invention a gas turbine power plant includes a combustion turbine arranged as referred to above, and a main compressor mounted coaxially with and driven by the turbine, and arranged to deliver compressed air to one or more combustion chambers from which the products of combustion are led to the turbine, and the cooling fluid admitted to the annular space or spaces between the rotor disc or discs and the annular body is derived from the main compressor and is admitted to the said annular space or spaces via one or more inwardly directed passages in the compressor rotor, and a conduit in the compressor and turbine rotor shafts.

The power plant preferably includes a rotary thrust balance piston mounted on the rear end of the turbine shaft, and means for admitting air under pressure to the piston from the conduit in the turbine rotor shaft.

Figure 2:
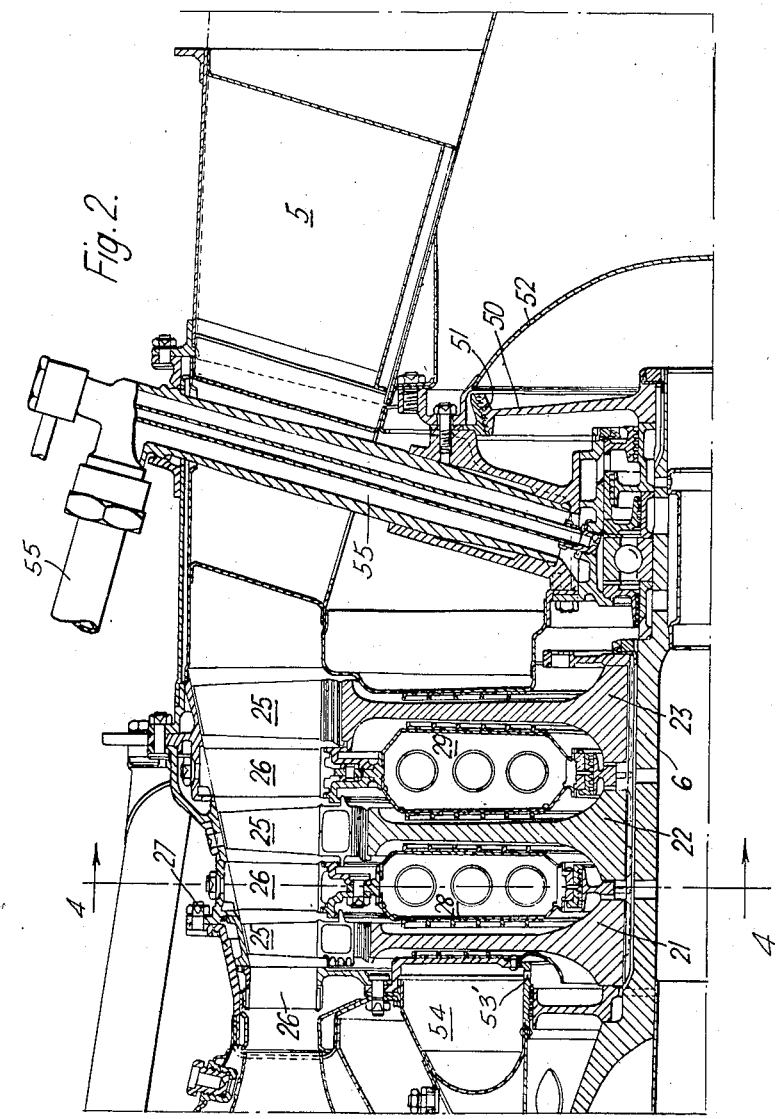
Figure 3:
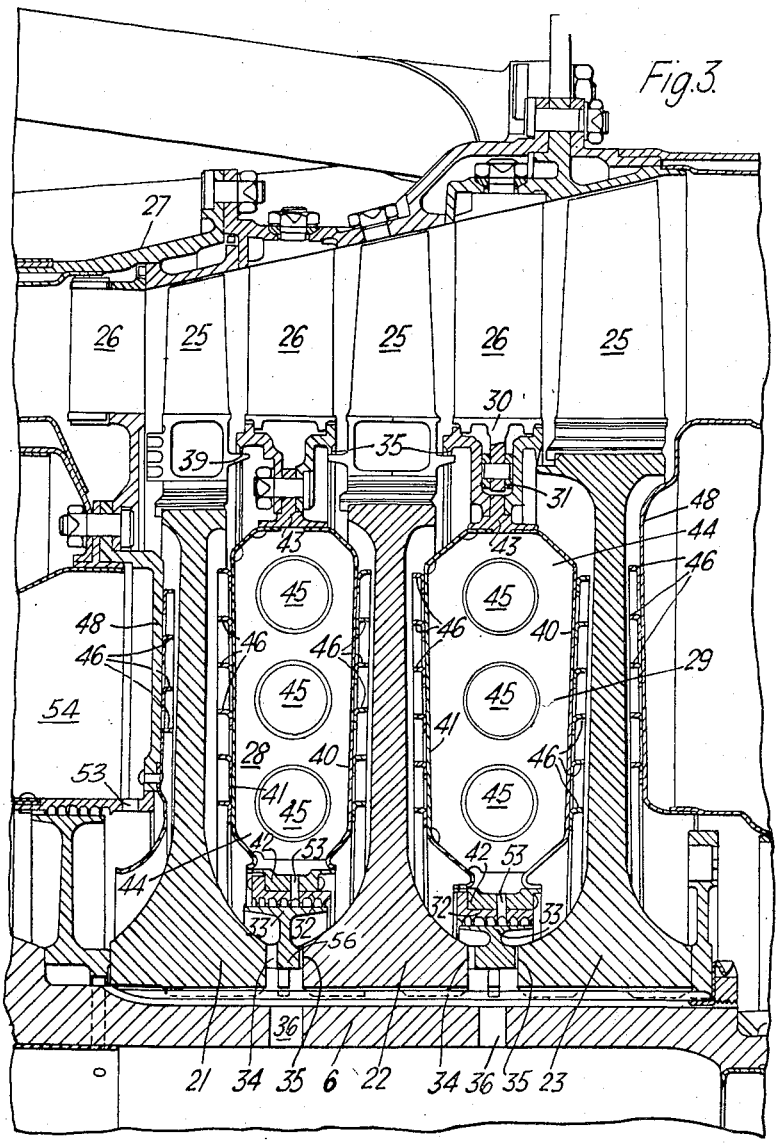
Figure 4:
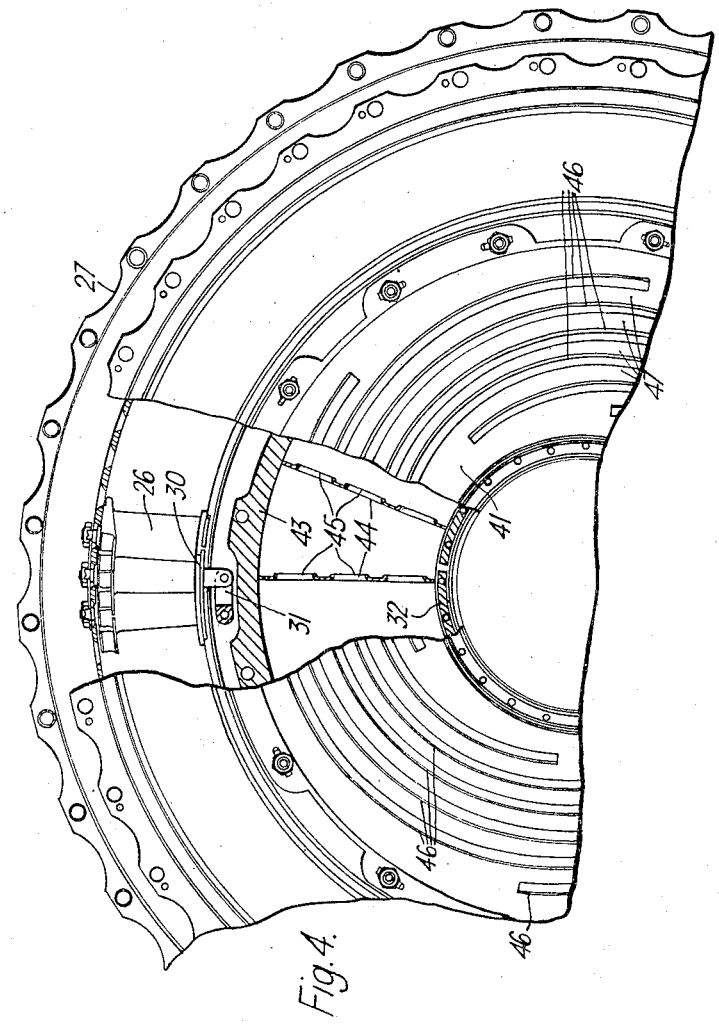

The invention may be performed in various different ways but one specific embodiment will now be described by way of example, as applied to the exhaust gas turbine of an aircraft propeller-turbine power installation, and with reference to the accompanying drawings, in which:

Figure 1 is a side elevation, partly broken away and partly in section, of the complete power unit, Figure 2 is an enlarged half sectional view of the exhaust turbine, Figure 3 is a half sectional view of the turbine, on a further enlarged scale, and Figure 4 is an end elevation of one of the annular bodies 28 partly broken away to show a cross section on the line 4—4 in Figure 2.

The power unit comprises basically an axial flow compressor 1, arranged to deliver compressed air to a series of combustion chambers 2 where the air is burnt in known manner with fuel supplied through supply passages 3, the products of combustion being fed to the working plenum of a turbine 4, and then passed to exhaust through the exhaust nozzle 5. The shaft 6 of the turbine 4 is directly coupled to the shaft 7 of the compressor 1, by means of a hollow tubular assembly 8 and the forward end of the compressor shaft is connected through a differential gear indicated generally at 9 in Figure 1 to a shaft 10 on which is mounted a propeller (not illustrated).

The turbine comprises three rotor discs 21, 22, 23 mounted for rotation on the rotor shaft 6, each rotor disc carrying at its outer periphery a series of spaced turbine rotor blades 25, constituting three turbine rotor rings. Interposed between the rotor rings and upstream thereof, are corresponding stator rings 26 each comprising a series of circumferentially spaced stator blades with their outer ends anchored to a stator casing 27.

The inner ends of the blades 26 of each of the interstage stator rings are connected to hollow annular interstage bodies 28, 29 formed of sheet metal and lying between adjacent rotor discs 21, 22, 23 and spaced therefrom by a small axial clearance. Each group of three adjacent stator blades is mounted at their inner ends on a common platform 30 (see Figure 4) which is pivotally connected to a point on the periphery of the respective body 28, or 29, by means of a tangential link 31, thus permitting thermal expansion of the blades in a radial direction, while yet providing accurate and rigid support for the interstage bodies 28, 29, concentric with the turbine shaft 6. In the present example where the axial distance between adjacent rotor discs 21, 22, 23 is approximately 2 inches the axial clearance between a rotor disc and the adjacent face of the adjacent interstage body 28, 29, is approximately 0.2 inch. The inner cylindrical surface of each interstage body is provided with a labyrinth seal 32 engaging a cylindrical flange formation 33 on a sealing member 56 arranged between each pair of adjacent rotor discs. Each sealing member is provided with radial drillings or cutaway portions 34, 35, which communicate with radial drillings 36 in the rotor shaft to permit cooling air to flow outwards from the hollow rotor shaft into the clearance spaces between each interstage body 28, 29, and the adjacent rotor discs 21, 22, 23.

The cooling air is derived from the main compressor 1, and is fed from immediately upstream of the last stage 38 thereof inwards into a conduit 37 within the compressor rotor shaft, assisted by vanes provided on one of the compressor rotor discs and arranged to act as a centripetal pump. The conduit 37 communicates directly with the interior of the turbine rotor shaft 6 through the hollow tubular connecting assembly 8.

The drillings 34 admitting cooling air to the annular spaces on the downstream sides of the rotor discs are larger than the drillings 35 admitting air to the upstream sides of the discs and thus tend to produce higher air pressures on the downstream sides of the discs so as to provide a counterbalancing axial thrust on the rotor of the turbine in a direction to resist the dynamic thrust caused by the gas flow through the turbine. The outlet of cooling air from the periphery of each annular space referred to is restricted by the usual knife edge seals 39 formed on the roots of the rotor blades 25.

Each interstage body 28, 29, is formed from two spaced annular sheet metal discs 40, 41, having inturned inclined flanges at their inner and outer peripheries, the extreme inner and outer edges of the discs 40, 41 being welded respectively to an inner annular ring or mounter 42 carrying the labyrinth seal 32, and an outer ring 43 to which the inner ends of the stator blades 26 are connected as described above.

The interior of each interstage body is vented through a drilling or aperture 53 in the mounters 42 and 42, to a midpoint in the labyrinth seals 32, 32, the drilling 53 thus acting as duct means maintaining an intermediate pressure in the interiors of the bodies 28 and 29, and reducing the differential pressure on each wall 40, 41, which can therefore be of relatively light construction.

Each interstage body 28, 29 is braced internally by a series of radial spacer plates 44 of approximately rectangular shape and having a number of cutaway apertures 45 to reduce weight and to permit air to circulate within the body. Although anchored only at its outer periphery each body is thus sufficiently stiff to withstand the combined pressure differences acting on its opposite external annular surfaces.

The external upstream and downstream faces of the discs 40, 41 of each of the interstage bodies are provided with spiral fins 46 which may of sheet metal welded to the body, and which tend to cause the cooling air to circulate outwards in spiral fashion over the face of the rotor discs 21, 22, 23, and thus to increase the length of the path and hence the cooling effect of the air in relation to the quantity of air passing.

Preferably the spiral fins 46 are arranged as shown in Figure 4 to provide relatively narrow spiral passages 47 which have a circumferential component of direction considerably greater than the radial component. Thus in the preferred illustrated construction five fins are provided, each extending around an angle of approximately 300°, the inner end of each fin being approximately 3.75 inches from the axis of the turbine rotor, while the outer end is approximately 6.5 inches from this axis. In this case the width of the passages 47 between the fins is approximately 0.4 inch.

Corresponding spiral fins 46 are also provided on the stator walls 48 lying adjacent the upstream surface of the first stator ring 21 and the downstream surface of the last stator ring 23, cooling air being supplied also to the clearance spaces between these walls and the adjacent rotor discs by way of port 53' from space 54 which is in communication with the outlets of the compressor, and from air supply passage 55 respectively.

On the rear end of the hollow turbine shaft 6 is mounted an additional thrust balancing piston 50, formed with a labyrinth seal 51 at its periphery which cooperates with a fixed part of the turbine casing to provide a substantially air tight seal therewith. The piston 50 is enclosed within a domed cover 52, also secured in gas tight manner to the turbine casing, and air from the hollow interior of the turbine shaft, 6, which is under substantial pressure is admitted direct to the space between the piston and the end cover, and thus exerts a counterbalancing axial thrust on the piston 50 and turbine shaft in an upstream direction to assist in counteracting the dynamic thrust in an axial direction caused by the flow of gas through the turbine.

The diameter of the rotor rings at the roots of the rotor blades 25 is in the present example 16.6 inches. The diameter of the first sealing member 33 between the first and second rotor discs 21, 22, where it engages the labyrinth seals 32 on the inner surface of the first interstage body 28, is 5.4 inches, while the corresponding diameter of the second sealing member 33 is 5.0 inches. The relative speed of the two contacting parts of each of these labyrinth seals varies of course as a direct multiple of their diameter, and in the construction described accordingly provides relative velocities of the order of a third of the velocity which would obtain if the interstage seals were adjacent the roots of the blades 25 in the rotor rings. Moreover the construction provides at the same time efficient cooling of the rotor discs blades and associated parts, and a certain degree of axial balancing thrust, and is light and compact.

What I claim as my invention and desire to secure by Letters Patent is:

1. A multi-stage axial flow turbine including a hollow rotor shaft, at least two rotor discs mounted for rotation with said rotor shaft, a series of circumferentially spaced rotor blades constituting a rotor blade ring mounted on each disc, a stator casing surrounding the working plenum of the machine, a series of circumferentially spaced stator blades secured at their outer ends to the stator casing and constituting a stator blade ring interposed between each adjacent pair of rotor blade rings, a hollow double walled annular interstage body secured to and extending inwardly from the stator blade ring and lying between and spaced from adjacent rotor discs, thereby providing an annular space between each wall of the interstage body and the adjacent rotor disc, an annular sealing member mounted on said rotor shaft and defining a fluid seal between said rotor discs and having radial drillings therethrough, a first certain of said radial drillings having their outlet ends communicating with said annular space at one side of said interstage body, a second certain other of said drillings having their outlet ends communicating with said annular space at the other side of said interstate body, sealing means mounted on the inner part of the interstage body and engaging said annular sealing member between said first and said second radial drillings, thereby providing an interstage fluid seal between the upstream and downstream sides of the stator blade ring and the interstage body, the diameter of the sealing member being considerably less than the inner diameter of the stator blade ring, and means for supplying cooling air to the hollow interior of said rotor shaft, said rotor shaft having drillings radially therethrough from the hollow interior to points intermediate said rotor discs, whereby air can be delivered through the hollow rotor shaft, the drillings through said rotor shaft, and the drillings through said annular sealing member to the regions between the interstage body and the adjacent rotor discs, the sealing member drillings communicating with the upstream side of the interstage body being of greater effective cross sectional area than the sealing member drillings communicating with the downstream side of the interstage body whereby greater air pressure is applied to the upstream side of the interstage body than on the downstream side of the interstage body to impart an axial counterbalancing thrust on the rotor disc upstream from said interstage body in a direction to oppose the dynamic thrust caused by gas flow through the turbine.

2. A multi-stage axial flow turbine as claimed in claim 1 in which the annular interstage body includes generally radial internal spacer plates extending between the annular walls of the body to stiffen the body against distortion in a plane containing the axis of the rotor shaft.

3. A multi-stage axial flow turbine as claimed in claim 1 in which the sealing means on the inner part of the interstage body comprises a multi-ringed labyrinth seal, said interstage body having an aperture communicating with the interior of the hollow interstage body and opening between two rings of said labyrinth seal.

4. A multi-stage axial flow turbine according to claim 1 in which said sealing means mounted on the inner part of the interstage body is formed with a radial drilling communicating between the hollow interior of the interstage body and an intermediate point on said annualar sealing member, such that the hollow interior of the interstage body is maintained at a pressure intermediate between the pressures existing in said annular spaces on the upstream and downstream sides of said interstage body.

References Cited in the file of this patent

UNITED STATES PATENTS

| | | |
|---|---|---|
| 2,584,899 | McLeod | Feb. 5, 1952 |
| 2,598,176 | Johnstone | May 27, 1952 |
| 2,620,157 | Morley et al. | Dec. 2, 1952 |
| 2,639,579 | Willgoos | May 26, 1953 |
| 2,640,319 | Wislicenus | June 2, 1953 |
| 2,648,519 | Campini | Aug. 11, 1953 |
| 2,738,949 | Wilkinson | Mar. 20, 1956 |
| 2,741,455 | Hunter | Apr. 10, 1956 |

FOREIGN PATENTS

| | | |
|---|---|---|
| 571,750 | France | Feb. 8, 1924 |